United States Patent [19]
Johnson

[11] 3,755,804
[45] Aug. 28, 1973

[54] LIQUID LEVEL SENSING SYSTEM AND APPARATUS

[76] Inventor: Walter P. Johnson, 510 S. Smith St., Aurora, Ill.

[22] Filed: Oct. 18, 1971

[21] Appl. No.: 190,135

[52] U.S. Cl............ 340/244 C, 73/304 R, 210/86, 210/104
[51] Int. Cl. .......................................... G08b 23/00
[58] Field of Search.................. 340/244 C; 210/86, 210/104; 73/304 R

[56] References Cited
UNITED STATES PATENTS
2,659,068  11/1953  Erickson ...................... 340/244 C
2,996,915  8/1961  Greenwood .................. 340/244 C Primary Examiner—Thomas B. Habecker
Attorney—La Valle D. Ptak et al.

[57] ABSTRACT

First and second pairs of electrodes are partially immersed into liquid on opposite sides of a cleaning screen with the electrodes on the discharge side being immersed to a greater depth than the electrodes on the input side of the screen. The electrodes are connected in a bridge circuit, the output of which is connected in series with the secondary winding of a step-down transformer supplied from a primary alternating current signal source. This series circuit is connected to the grid electrode of a triode which controls an alarm relay.

The electrodes in each of the pairs are parallel stainless steel electrodes separated by insulating spacers.

10 Claims, 4 Drawing Figures

PATENTED AUG 28 1973 3,755,804
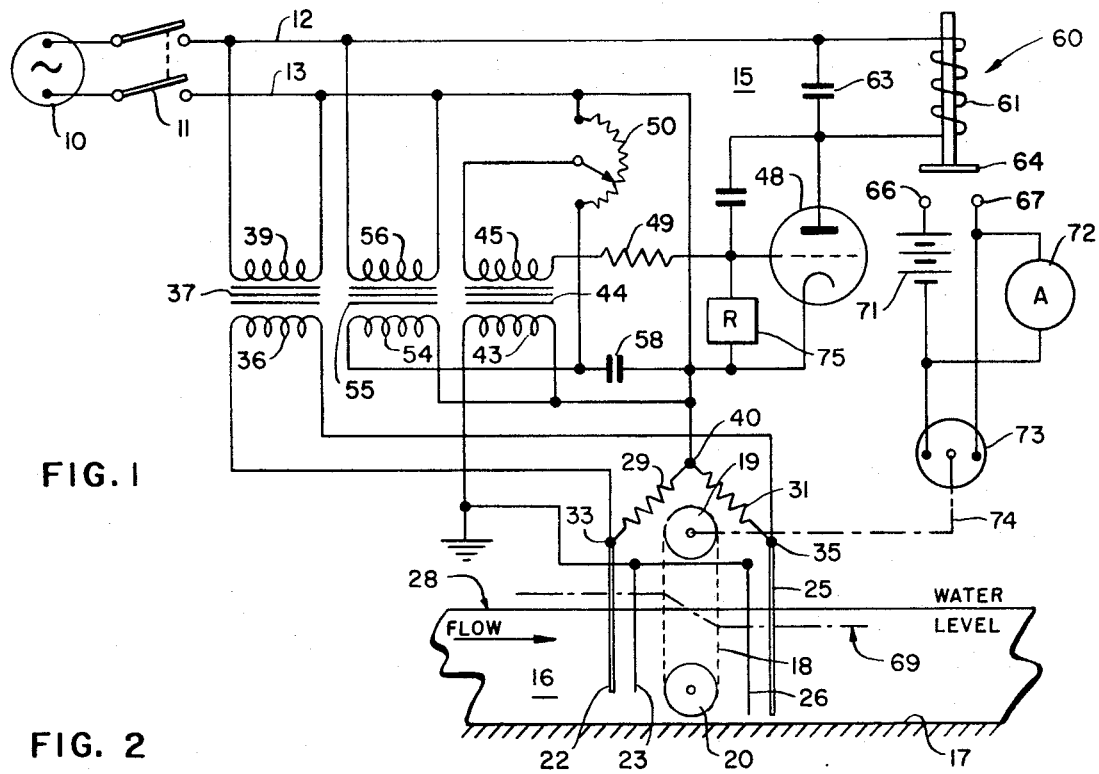
FIG. 1
FIG. 2
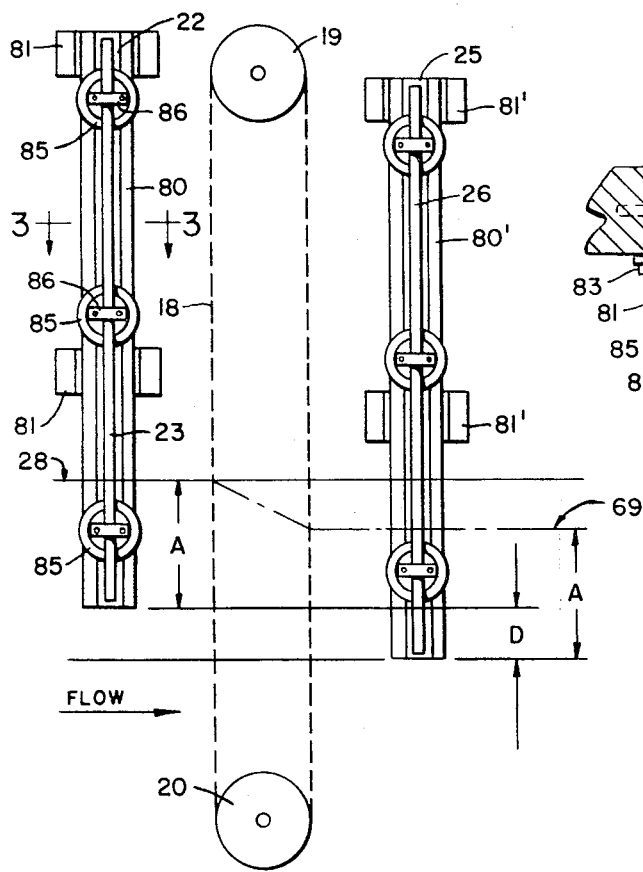
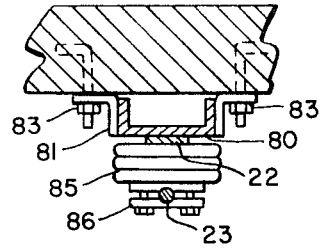
FIG. 3
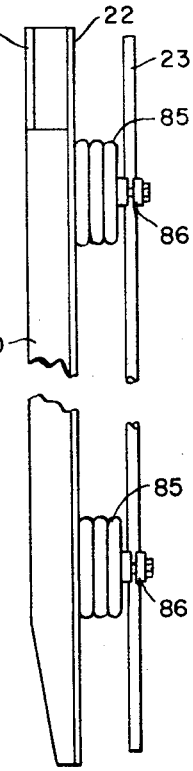
FIG. 4

LIQUID LEVEL SENSING SYSTEM AND APPARATUS

BACKGROUND OF THE INVENTION

In supplying water to the condensers of a power plant or to the pumping station of a water filtration plant, it generally is necessary to screen solid debris, such as sticks, leaves and refuse of various types, out of the incoming stream of water to keep such debris out of the narrow passages of the condensers or pumps. Generally, a continuously rotating cleaning screen is employed for this purpose, and the screen is placed across the channel between the main reservoir of the water supply and the inlet pool to the pumps or condensers. Due to the fact that much of the rotating mechanism for the cleaning screen is continuously immersed in the water, relatively rapid wear of the equipment takes place so that frequent and expensive maintanence often is necessary.

In many systems little debris is encountered much of the time, so that such continuous operation of the cleaning screen would not be necessary if a reliable means for detecting when the screen was becoming clogged could be used to initiate operation of the screen only when operation was needed.

In addition there are occasions when, due to storms, floods ice conditions or the like, an operating screen may become clogged to the extent of substantially diminishing the flow of water through the screen from the main reservoir to the water inlet pool on the downstream side of the screen. If the water is pumped from the pool at a rate faster than water passes through the screen, the difference in pressure on opposite sides of the screen can become sufficient to cause a collapse or destruction of the screen. Even if the screen were not destroyed by such a difference in pressure, the supply of water in the inlet pool could become sufficiently low due to screen clogging that the equipment provided with the water could be damaged because of an inadequate water supply. It is important therefor to be able to accurately detect differences in water level on the reservoir or input side of a cleaning screen and the inlet pool or output side of such a screen whenever differences in water levels on opposite sides of the screen occur for any reason.

A system for detecting differences in liquid level on opposite sides of a cleaning screen is disclosed in U.S. Pat. No. 2,659,068 to Erickson and Johnson. The system disclosed in this patent is satisfactory when the absolute level of the water in the main reservoir supplying water through the screen to the inlet pool does not undergo fluctuations of more than a relatively few feet (of the order of 5 or 6 feet) due to seasonal variations or other causes. When the absolute water level of the main reservoir is subject to extensive variations, so that long electrodes must be used, the system of the above mentioned Erickson/Johnson patent requires an auxillery compensating circuit to compensate for the wide variations in impedance which occur with variations in the depth of the water supply in the reservoir. Such an auxillery compensating circuit increases the expense of the system and also increases its complexity.

SUMMARY OF THE INVENTION

IT is an object of this invention to provide an improved liquid level sensing system.

It is an additional object of this invention to provide a simple and reliable system for detecting differential liquid levels.

It is a further object of this invention to provide an improved electrode structure for a liquid level sensing device.

It is yet another object of this invention to provide a differential liquid sensing system which provides reliable operation in spite of wide fluctuations in the absolute level of the liquid supply.

In a preferred embodiment of this invention, a system for sensing differences in the level of liquids at first and second spaced points includes first and second pairs of spaced conductive electrodes, each located for partial immersion into the liquid at the first and second spaced points, respectively. A resistance is connected between the upper ends of one of the electrodes of each of the pairs and the other electrodes of each of the pairs are connected together at a common point to form a bridge circuit. The primary winding of a bridge transformer is connected between an intermediate point on the resistance and the common point to provide an output from the bridge cicuit on the secondary winding of the bridge transformer.

The primary winding of a first step-down transformer is connected to a conventional alternating current source, and has a secondary winding coupled to the junctions of the resistance with the upper ends of the electrodes to provide an input to the bridge circuit. The secondary winding of a second step-down transformer, the primary of which is connected with the alternating current source, is connected in series circuit with the secondary winding of the bridge transformer to control an indicating device.

In a more specific embodiment of the invention, the second pair of electrodes is extended to a greater depth in a liquid than the first pair to unbalance the bridge for the same liquid level at both points. This unbalance is translated by the secondary winding of the bridge transformer as a phase opposition bucking signal to the signal obtained from the secondary winding of the second step-down transformer to cause a first or normal output condition from the indicating device. When the bridge becomes balanced, due to a drop in the liquid level at the second point relative to the liquid level at the first point, no output is obtained therefrom. The output from the secondary winding of the second step-down transformer then is sufficient to operate the indicating device to a second condition to indicate that a predetermined differential in liquid level between the first and second points exists. A further unbalancing of the bridge, caused by a further drop in the liquid level at the second point relative to the first point, causes a reversal in the phase of the signal in the secondary winding of the bridge transformer to augment the signals causing operation of the indicating device to its second condition. Each of the electrode pairs in a preferred embodiment consist of parallel stainless steel electrodes.

BRIEF DESCRIPTION OF THE DRAWING

FIG. 1 is a schematic diagram of a preferred embodiment of the invention;

FIG. 2 illustrates details of the electrode structure and placement of the sensing portions of the system shown in FIG. 1; and FIGS. 3 and 4 show details of the electrode structure of FIGS. 1 and 2.

DETAILED DESCRIPTION

In the drawing, the same reference numerals are used throughout the several Figures to designate the same or similar parts.

Referring first to FIG. 1, there is shown an alternating current supply source 10 which is connected through a suitable switch 11 to a pair of alternating current supply leads 12 and 13. The source 10 supplies the usual house voltage of from 110 to 120 volts, 60 Hertz AC as a convenient source of power for the system. The alternating current source, of course, could be of different voltages and frequencies, but the one desceibed is convenient since it is practically universally available.

The primary alternating current signal which is present on the leads 12 and 13 is supplied to a differential liquid sensing system 15 as the operating power for the system. The sensing system 15 is utilized in connection with a water supply system, illustrated as including a stream 16 which is confined within a suitable channel or tunnel having a bottom wall 17 and a pair of side walls (not shown). A suitable rotatable cleaning screen 18 is located within the channel between the reservoir or input side shown to the left of the screen in FIG. 1 and the inlet pool or output side shown to the right of the screen 18 in FIG. 1. The screen 18 is shown as being driven by a drive roller 19, located above the surface of the water, with an idler roller 20 located below the surface of the water near the bottom of the channel 17. The screen 18 generally is constructed of metal and may be of a suitable conventional configuration, the details of which are not important to an understanding of the liquid level sensing system 15.

As is well known, the function of the screen 18 is to remove debris and solid impurities which are intercepted by it to keep such debris and impurities from clogging the equipment using the water obtained from the inlet pool to the right of the cleaning screen 18. The screen 18 may be continuously oprated by continously driving the driving wheel 19; but if little or no debris is carried by the flow of water from the reservoir to the left of the screen, such continuous operation results in unnecessary wear.

Whether the screen is intermittently operated or continuously operated, however, it is subject to clogging; so that it is desirable to accurately detect when the water level on the pool or outlet side of the screen drops to some predetermined level below the level of the water on the input or reservoir side of the screen. Such a drop in the water level on the outlet side of the screen 18 can occur if the screen becomes sufficiently clogged to restrict the flow of water through the screen to an amount less than the rate at which the water is withdrawn from the inlet pool to the right of the screen.

To permit detection of the differential water levels on the two sides of the screen 18, a first pair of elongated electrodes 22 and 23 are partially immersed on the reservoir side of the screen 18 to a depth sufficient to insure that a substantial portion of the electrodes 22 and 23 are always immersed, irrespective of fluctuations in the reservoir water level which may take place. A second pair of electrodes 25 and 26 are partially immersed into the water on the inlet pool side of the screen 18 and extend from a point well above the normal level 28 of the water to a point which is a fixed preestablished distance below the bottom ends of the pair of electrodes 22 and 23. This distance is indicated as distance D(illustrated in FIG. 2 which shows the two pairs of electrode assemblies on opposite sides of the cleaning screen 18).

The upper ends of the electrodes 23 and 26 are interconnected in common to ground. A pair of resistors 29 and 31 are connected between the upper ends of the electrodes 22 and 25 at a pair of terminals 33 and 35; so that the two pairs of electrodes 22, 23 and 25, 26 and the two resistors 29 and 31 form a Wheatstone bridge circuit. An alternating current potential is supplied to the input terminals 33 and 35 of the bridge circuit through the secondary winding 36 of a step-down transformer 37, the opposite ends of the primary winding 39 of which are connected to the leads 12 and 13. The transformer 37 is used to reduce the potential on the grounded portion of the system to about six or twelve volts.

The bridge preferably is constructed with the resistors 29 and 31 of equal value. The resistances of the other two arms of the bridge constitute the resistance between the electrodes 22 and 23 for one of the other arms and the resistance between the electrodes 25 and 26 for the other of the arms. The values of these resistances are determined by the conductivity of the water, the contact resistance of the water and electrodes and the depth of immersion of the respective electrode pairs 22, 23 and 25, 26. Output terminals of the bridge constitute a junction 40 between the resistors 29 and 31 and the ground terminal to which the upper ends of the electrodes 23 and 26 are connected.

If the resistors 29 and 31 are equal in value and if the liquid level is the same on both sides of the screen 18, as indicated by the level 28, a greater resistance exists between the electrodes 22 and 23 than exists between the more deeply immersed electrodes 25 and 26. This causes the bridge to be unbalanced by an amount determined by the distance D (FIG. 2). Thus, a potential exists between the junction 40 and ground with equal water levels on both sides of the cleaning screen 18. The magnitude of this potential is determined by the values of the resistances in the arms of the bridge, and the phase of it is determined by which of the electrode pairs 22, 23 and 25, 26 has the greater resistance. This output potential is applied to the primary winding 43 of a step-up transformer 44, having a high voltage secondary winding 45, one end of which is connected to the grid of a triode vacuum tube 48 through a resistor 49. The other end of the winding 45 is connected through the tap of an adjustable potentiometer 50 to the cathode of the tiode 48 to control the grid bias of the triode 48.

The secondary winding 45 of the transformer 44 is connected in a series circuit with the secondary winding 54 of a second step-down transformer 55 (similar to the transformer 37), the primary winding 56 of which is connected across the power supply means 12 and 13. With the bridge initially unbalanced in the manner described above, the signals on the secondary winding 45 are in phase opposition to the signals induced in the secondary winding 54 of the transformer 55. The relative amounts of these signals applied across the grid-cathode circuit of the tube 48 are adjusted by adjusting the tap on the potentiometer 50, since one end of the secondary winding 54 is connected directly to the cathode of the tube 48; and the other end is connected through the lower portion of the potentiometer 50, the winding 45, and the resistor 49 to the grid of the triode 48.

In the absence of any signals induced in the secondary winding 45, the phase and magnitude of the signals applied by the secondary winding 54 to the grid of the triode 48 are sufficient to cause the triode 48 to be rendered nonconductive. This state of operation corresponds to an alarm state of operation.

As stated previously, the phase of the signals induced in the secondary winding 45 of the transformer 44, however, for the unbalanced condition of the bridge circuit, indicating that the water level 28 is the same on both sides of the cleaning screen 18, operates to cause an out-of-phase bucking signal to be combined with the signal from the secondary winding 54. The magnitude of this out-of-phase signal is sufficient to prevent the signal applied by the secondary winding of the transformer 54 from rendering the tube 48 nonconductive, and sufficient forward bias is applied to the grid of the tube 48 to cause it to be normally conductive. A capacitor 58 is connected across the ends of the winding 54 to correct the power factor of the grid circuit of the tube 48 to maintain the alternating potential in the grid circuit in proper phase relationship with the potential applied to the plate circuit to maintain the tube conductive for the state of operating conditions just described.

A relay 60 has an operating winding 61 connected in series with the plate circuit of the tube 48, with one terminal of the winding 61 connected to the plate of the triode 48 and the other terminal connected to the lead 12. The cathode of the triode 48 is connected directly to the other power supply lead 13, and a capacitor 63 is connected across the winding 61 to keep the armature 64 of the relay 60 from chattering and to provide additional power factor correction.

With the water level 28 maintained as shown in FIGS. 1 and 2 of the drawing, sufficient bucking potential is applied by the winding 45 in series with the control winding 54 to cause the triode 48 to be maintained conductive. Current then normally flows through the plate circuit and energizes the winding 61 of the relay 60, causing the armature 64 to be retracted to the position shown in FIG. 1 thereby opening the circuit between a pair of stationary contacts 66 and 67.

When the liquid level on the right-hand or output side of the screen 18 drops to a distance D below the level on the input or left-hand side of the screen 18, the bridge becomes balanced due to equal resistances appearing between the electrodes of each electrode pair 22, 23 and 25, 26. When this occurs, no potential then is applied across the primary winding 43 of the step-up transformer 44, and no bucking potential is induced in the secondary winding 45. Thus, the full potential available from the secondary winding 54, as determined by the step-down ratio of the transformer 55, the value of the resistor 49 and the setting of the tap of the potentiometer 50, is applied to the grid of the triode 48. The phase and magnitude of this potential is selected to be sufficient to decrease the plate current of the triode 48 to a level which is insufficient to maintain the relay 60 energized or operated. This causes the armature 64 to be released, bridging the contacts 66 and 67. When this occurs, a circuit is completed from a battery 71 through an alarm 72 and through an operating motor 73 to drive the drive wheel 19 of the screen 18 through a suitable mechanical link indicated by the dashed line 74 in FIG. 1.

The alarm 72 may be of any suitable form, such as a light, audible alarm, or other indication; and the control motor or control 73 also may take a number of different forms. As indicated in FIG. 1, the screen 18 is not operated or rotated until the differential water level D is sensed by the system, whereupon operation of the screen commences. If operation of the screen is successful to remove the debris which caused the lowering of the water level on the pool side of the screen, the water level on the pool side of the screen once again rises; and the signals induced in the secondary winding 45 of the transformer 44 increase. These singals become of sufficient magnitude to once again buck or decrease the reverse bias applied to the grid of the tube 48 by the winding 54 to the point where the current conducted through the winding 61 of the relay 60 again becomes sufficient to withdraw the armature 64 to the position shown in FIG. 1. The alarm 72 and the control 73 then are rendered inoperative, and the original state of conditions exists.

In the event that the water level on the right-hand or pool side of the screen 18 continues to decrease past the level 69 where each of the electrode pairs are immersed to the same depth A illustrated in FIG. 2, the electrode pair 25 and 26 is immersed by a lesser amount than the electrode pair 22 and 23. This causes the phase of the signals induced in the secondary winding 45 to be reversed from the initial set of conditions described above since the bridge becomes unbalanced in the opposite direction. Thus, the signals applied by the winding 45 to the tube 48 reverse to a series aiding phase relationship with the signals applied by the winding 54. This results in additional reduction of the conductivity of the triode 48 and insures that the relay 60 remains deenergized. If such a condition persists for a prolonged period of time, it indicates that the operation of the screen 18 is insufficient to remove the clogging debris or perhaps the screen has failed to operate. Thus, in addition to the circuit shown in FIG. 1, a timing circuit or additional alarm circuit could be employed to shut down the equipment withdrawing water from the pool on the right-hand side of the screen 18 if the relay 60 remains deenergized for more than a predetermined safe interval of time. Such additional control circuitry, however, would be initiated into operation by the release of the relay 60 in the manner described above and could be implemented in a number of conventional ways.

If it is desired to record the differences in water level on opposite sides of the screen 18, an indicating recorder 75 may be connected across the grid-cathode biasing circuit for the triode 48. Connected in this manner the recorder 75 may be used to record the variations in potential of the bridge circuit as reflected by variations of the output of the winding 45 combined with the constant output of the winding 54.

The screen 18 is grounded in the water 16 confined within the channel but is not used as a common electrode or as a part of the bridge circuit 29 since to do so could result in undersirable change in the differential setting by picking up other grounded objects as the pool level rises and falls. For this reason, the closely spaced pairs of electrodes 22, 23 and 25, 26 are employed, with the spacing between the electrodes of each of the pairs typically being of the order of 3 to 6 inches. The electrode structure is most clearly shown in FIGS. 2, 3 and 4, and the details of the electrode pair 22, 23 are shown in the cross-section and side views of FIGS. 3 and 4. It is to be understood that the electrode pair 25, 26 is identical to the electrode pair 22, 23.

Each of the electrode pairs are mounted on a suitable mounting support 80, which preferably is in the form of a U-shaped beam of steel or the like having substantial mechanical strength since the lengths of the electrode pairs for typical installations may be between 15 and 50 feet or more. The support member 80 is attached to a side wall of the water channel by a suitable number of spaced mounting brackets 81, one of which is most clearly shown in FIGS. 3 and 4. The brackets 81 are fastened to the wall of the water channel with suitable fasteners, such as conventional bolts and nuts 83.

One of the electrodes of each pair, illustrated as the electrode 22 or 25, is in the form of an elongated bar of rectangular conductive material, preferably stainless steel, which is attached to the support 80 by any suitable means. At intervals along the length of the support 80, insulating spacers 85 are provided for mounting the second electrode of each pair, illustrated as the electrodes 23 and 26, parallel to the electrodes 22 and 25 respectively, as best shown in FIG. 4. Suitable clamps 86 are used to effect the mounting of the rods 23 and 26, on the spacers 85. The distance between adjacent ones of the insulating spacers 85 is not critical, with the number employed merely being sufficient to provide sufficient mechanical strength and rigidity to the assembly. Typically the spacers 85 are used at 4 to 6 foot intervals along the length of the support 80.

The electrodes 23 and 26 are made of the same material as the electrodes 22 and 25 and are shown as stainless steel rods. Current between the elctrode 23 and the electrode 22 (and between the electrodes 26 and 25) is confined to a line formed between the nearest point of the rod 23 with the center of the electrode 22. Since both electrodes of the electrode pairs 22, 23 and 25, 26 are made of the same material, deterioration of the electrodes by electrolysis is prevented. In addition, since the conductive paths between the electrode 23 and the support member 80 are greater than the nearest or shortest conductive path between the center of the electrode 23 and the nearest point of the electrode 23 (best seen in FIG. 3), erosion of the beam 80 by electrolysis between it and the electrode 23 also is eliminated or substantially reduced, thereby prolonging the life of the assembly.

It should be noted that the circuit which has been described is not dependent upon the magnitude of the bridge output for supplying the bias to the tube 48 which causes the tube 48 conductivity to be reduced to the point at which the relay 60 is released. The winding 54 of the step-down transformer 55 supplies sufficient output with no signal induced in the winding 45 to cause this to occur. Thus, absolute variations in the water level from a very high level to an extremely low level, which causes the resistance in both of the arms of the bridge formed by the electrode pairs 22, 23, and 25, 26 to rise significantly, do not prevent operation of the alarm circuit shown. Such absolute variations in the water level on both sides of the screen 18 substantially increase the impedance of the bridge thereby substantially reducing the output of the bridge applied across the primary winding 43. As described previously, however, the function of the transformer 44 is such that with the bridge in balance, the winding 54 causes the tube 48 to be biased to a point where the relay 60 is de-energized. Thus, it is not necessary to provide additional circuitry to compensate for large variations in the absolute or common changes of water level on both sides of the screen.

I claim:

1. A system for sensing differences in the level of liquids at first and second spaced points including in combination:

first and second spaced conductive electrodes comprising a first pair of electrodes extending downwardly at the first of the spaced points for partial immersion into liquid located at the first of said spaced points;

third and fourth spaced conductive electrodes comprising a second pair of electrodes extending downwardly at the second of the spaced points for partial immersion into liquid located at the second of the spaced points, said second pair of electrodes extending into such liquid a predetermined distance greater than said first pair of electrodes extends with the liquid level at the first and second spaced points being the same;

resistance means connected between said first and third electrodes at first and second junctions, respectively;

means for interconnecting said second and fourth electrodes at a third junction;

indicating means;

first means for connection with a primary source of electrical potential for impressing a difference of electrical potential between said first and second junctions;

bridge circuit output means coupled between said third junction and a point on said resistance means intermediate said first and second junctions and further coupled with said indicating means for applying thereto a potential, the magnitude and phase of which is indicative of differences in liquid level at said first and second positions; and second means for connection with the primary source of electrical potential coupled with said indicating means for applying a predetermined potential at a predetermined phase thereto.

2. The combination according to claim 1 wherein said first, second, third and fourth electrodes all are made of the same material.

3. The combination according to claim 2 wherein said first, second, third and fourth electrodes are made of stainless steel.

4. The combination according to claim 1 wherein said first and second means for connection with the primary source of electrical potential comprise first transformer means having at least one primary winding and first and second secondary windings corresponding to said first and second connection means, respectively, with the primary source of electrical potential being an alternating current potential supplied to said primary winding, said first secondary winding being connected between said first and second junctions and said second secondary winding being coupled in circuit with said indicating means; and said bridge circuit output means comprises a second transformer having a primary winding coupled between said third junction and said point on said resistance means and having a secondary winding coupled with said indicating means.

5. The combination according to claim 4 wherein the coupling of said second secondary winding of said first tranformer means with said indicating means is in series circuit through said secondary winding of said second transformer.

6. The combination according to claim 5 wherein said first transformer means comprises step-down transformer means and said second transformer comprises a step-up transformer.

7. The combination according to claim 6 wherein the second secondary winding of said first transformer means and the secondary winding of said second transformer are connected together in series circuit with said indicating means, the imbalance of said bridge circuit for the same liquid level at the first and second spaced points causing a signal to be produced in the secondary winding of said second transformer which is in phase opposition to the signal from the second secondary winding of said first transformer means to cause a first output to be obtained from said indicating means, balancing of said bridge removing such phase opposition signal with the signal from the second secondary winding of said first transformer means in the absence of such phase opposition signal being of sufficient magnitude to cause a second output to be obtained from said indicating means.

8. A liquid level sensing system for sensing differences in the level of a liquid on opposite sides of a screen disposed in a stream channel including in combination:

an alternating current power supply circuit;
a relay with a winding and having a normal condition of operation and an alarm condition of operation;
an electronic control device having an output circuit connected in series with said relay winding to said power supply circuit and having a control electrode;
first and second spaced conductive electrodes comprising a first pair of electrodes extending downwardly on one side of the screen for partial immersion into liquid located on said one side of the screen;
third and fourth spaced conductive electrodes comprising a second pair of electrodes extending downwardly at the other side of the screen for partial immersion into liquid located at said other side of the screen, the ends of said third and fourth electrodes extending downwardly beyond the ends of said first and second electrodes a predetermined distance;
resistance means connected between said first and third electrodes at first and second junctions, respectively;
means for interconnecting said second and fourth electrodes at a third junction to complete a bridge circuit comprising said resistance means and said first and second pairs of electrodes;
supply transformer means having at least one primary winding and first and second secondary windings, the primary winding of which is coupled with said alternating current power supply circuit, the first secondary winding of which is connected across said first and second junctions;
a bridge output tranformer having a primary winding and a secondary winding, with the primary winding connected between said third junction and an intermediate point on said resistance means;
means for connecting the secondary winding of said bridge transformer in series circuit with the second secondary winding of said supply transformer means and the control electrode of said electronic control device, said electronic control device causing the relay to be in its normal condition of operation with the secondary winding of said bridge transformer supplying AC signals in phase opposition to the signals applied to the electronic control device from the second secondary winding as a result of a bridge circuit imbalance caused by the differences in deth of immersion of said first and second pairs of electrodes for liquid of the same level on opposite sides of the screen, the signals from the second secondary winding being sufficient to cause said electronic control device to operate said relay to said alarm condition of operation in the absence of phase opposition signals from the secondary winding of said bridge transformer; and
means coupled with said relay circuit for responding to said alarm condition of operation thereof.

9. The combination according to claim 8 wherein said first transformer means comprises first and second transformers having first and second primary windings coupled with said alternating current power supply circuit, said first and second transformers being step-down transformers having the first and second secondary windings, respectively, and said bridge output transformer comprising a step-up transformer.

10. The combination according to claim 8 wherein said electronic control device comrises a triode tube, with an anode, cathode and grid, having the anode and cathode connected in series circuit with said relay winding to said power supply circuit, with the second secondary winding and the secondary winding of said bridge output transformer being connected in series circuit across the grid and cathode of said triode, the signals induced in said second secondary winding being sufficient to cause said triode to be rendered nonconductive in the absence of signals of opposite phase from the secondary winding of said bridge output transformer.

* * * * *